May 3, 1949.  G. B. REIMANN  2,469,129
SPECTROPHOTOMETRIC CURVE READING APPARATUS
Filed Nov. 5, 1945  2 Sheets-Sheet 1
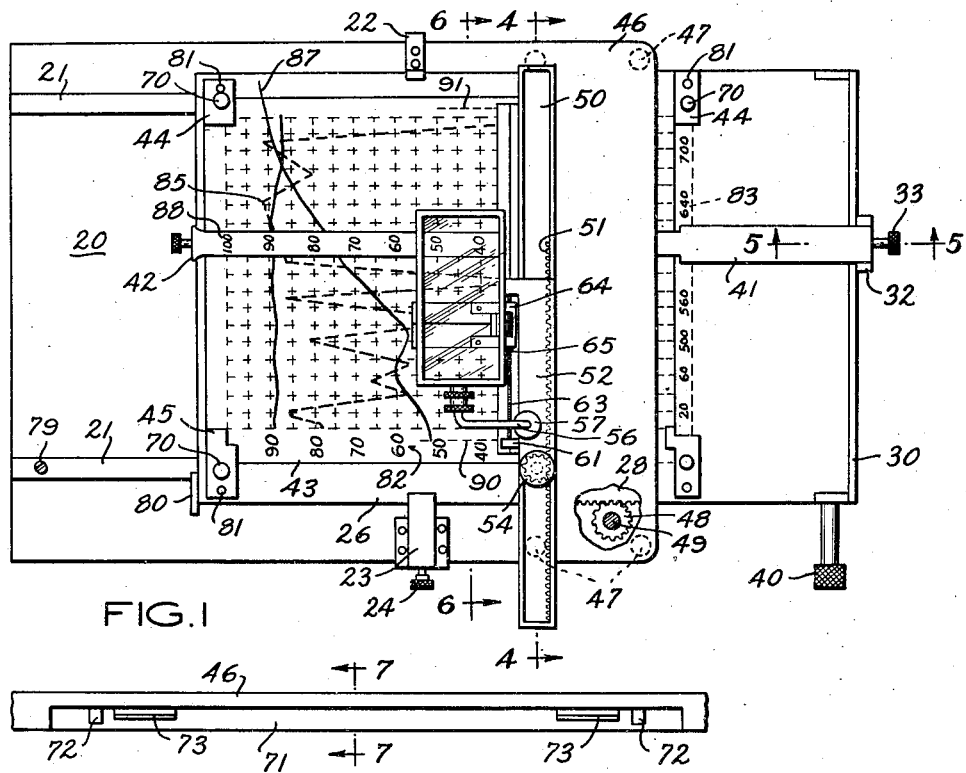
FIG.1
FIG.6
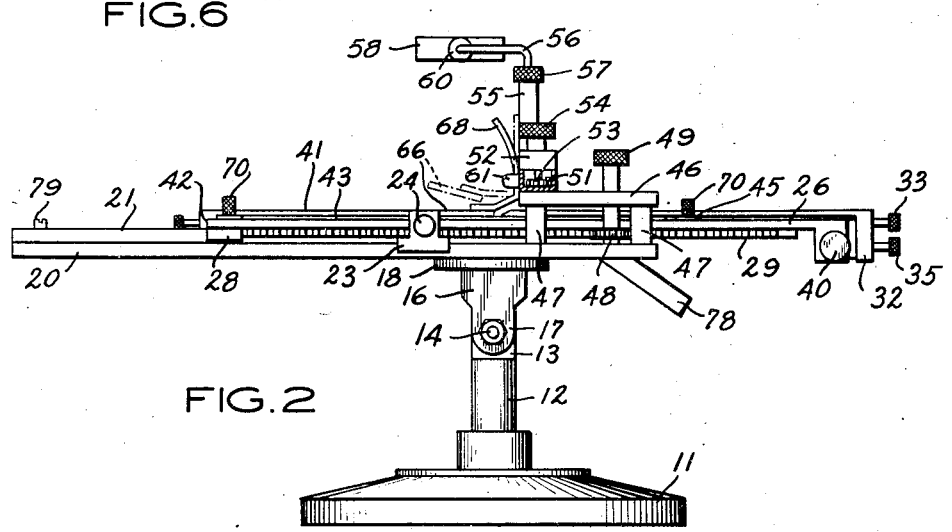
FIG.2
FIG.7
INVENTOR
GENEVIEVE BECKER REIMANN,
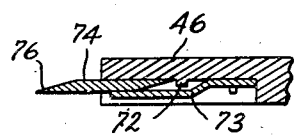
ATTORNEY May 3, 1949.  G. B. REIMANN  2,469,129
SPECTROPHOTOMETRIC CURVE READING APPARATUS
Filed Nov. 5, 1945  2 Sheets-Sheet 2

INVENTOR
GENEVIEVE BECKER REIMANN,
BY Howard J. Whelan.
ATTORNEY

Patented May 3, 1949

2,469,129

UNITED STATES PATENT OFFICE 2,469,129

SPECTROPHOTOMETRIC CURVE READING APPARATUS

Genevieve Becker Reimann, Baltimore, Md.

Application November 5, 1945, Serial No. 626,765

6 Claims. (Cl. 88—39)

This invention relates to graph-interpreting instruments and more particularly to those adaptable for the mechanical evaluation of curves of a spectrophotometric nature, such as those derived from a conventional recording spectrophotometer.

An object of this invention is to provide a new and improved method of reading spectrophotometric curves that will avoid one or more of the disadvantages and limitations of the prior art.

Another object of the present invention is to provide a new and improved method of reading spectrophotometric curves that will facilitate the determining of the mathematical relation of the curves through the use of a mechanical device.

A further object of the invention is to provide a new and improved mechanism that can be employed to mechanically lay out curves or points on a graph sheet.

An additional object of this invention is to provide a new and improved method of reading spectrophotometric curves that will enable wavelength corrections to be applied to same, in a manner that permit an accurate and practical determination to be made.

Still another object of the present invention is to provide a new and improved mechanism for reading spectrophotometric curves that will facilitate the evaluation of readings; that will be convenient to use; that can be constructed in portable form and will have other valuable features of scientific and practical value.

An object of this invention is to provide a spectrophotometric curve reader that will eliminate the undue eyestrain resulting from the many transverse and vertical movements, required by the eyes, in the reading of spectrophotometric curves.

Another object of this invention is to decrease the amount of time required to read spectrophotometric curves, particularly when a wavelength correction is required.

An additional object of this invention is to construct into a convenient, portable instrument, the aids and adjuncts needed for the reading of spectrophotometric curves, and this instrument is designed so that magnified images of the spectrophotometric curve, the wave-length scale and the reflectance scale are brought into juxtaposition for reading, the whole device being suitable for and adaptable to any operator.

Other objects will become apparent as the invention is more fully set forth.

A spectrophotometer of the conventional recording type, when properly calibrated and operated, yields a spectrophotometric curve, which is unique for the color of the sample measured. This curve is the first step in the process of reducing a color to its fundamental terms or elements, so that it may be expressed and related to all other colors.

After obtaining the spectrophotometric curve which is registered on a sheet of conventional graph paper, the second step is to "read" the curve. There are two general methods of reading curves. These are known as: (1) the selected ordinate method and (2) the weighted ordinate method. The device to be hereinafter described is applicable to either or both. The selected ordinate method requires reading points at ninety (90) designated wavelengths throughout the visible spectrum and a simple form of computation. The weighted ordinate method requires reading at but forty (40) designated wavelengths throughout the visible spectrum but this method together with a longer and more rigorous form of computation is generally used when careful standardization and precision in required, as, for example, in the standardization of railway signal glasses or in setting up specifications for national and international color standards. When the latter method is required it is customary, when measuring such samples on the spectrophotometer, to measure at the same time and on the same graph sheet, certain standards which have been previously calibrated and whose spectrophotometric values are known. These standards serve as checks on the instrument and on errors of all kinds, such as the positioning of the graph paper in the instrument. The positioning of the paper in the instrument affects the positioning of the wavelength scale, which in turn can result in introducing errors of considerable magnitude into the measurement. The graph paper itself, due to shrinkage or expansion, caused by humidity changes, can cause the wavelength to shift from its true position by as much as several millimicrons. In careful standardization work, therefore, certain standards are used to correct the wavelength scale. These corrections represent how much the wavelength scale should be adjusted (in either a plus or minus direction or both) to give a true reading for the measured sample or samples at the forty (40) wavelengths or points throughout the visible spectrum to be read. Any one graph sheet, in addition to the calibration curves, may have one or a dozen sample curves recorded on it, depending upon the nature of the sample (mixture of the dyes, etc.) and the purpose of the work. Each graph sheet usually has a different wavelength correction but the correction to be applied to each and all curves on any one graph sheet are the same. The instrument to be described may be used for reading curves with or without the wavelength correction.

The determination of a reading for a single point on a spectrophotometric curve requires a concentrated visual inspection of that point where the spectrophotometric curve and the wavelength cross each other, and if a wavelength correction is required, the application of the wavelength correction indicated for that point and finally, reading this adjusted or corrected point in terms of the reflectance scale, found at the left of the graph sheet.

The smallest subdivision on the conventional graph sheet from which spectrophotometric curves are read, may be as minute as one (1) millimeter. When making a reading and applying a wavelength correction, this division is further subdivided into twenty (20) parts. This minute subdividing is done by visual estimate at each of the forty (40) wavelengths of the visible spectrum. If a magnifying lens is used in estimating the amount of wavelength correction at each given point, the wavelentgh scale as well as the reflectance scale to which each of these points must be referred is usually out of the line of sight and the eyes must continuously reaccommodate and re-focus when making the determinations.

In determining the values for a single spectrophotometric curve, requiring no wavelength correction, the eye must travel in transverse and vertical directions at least one hundred and twenty (120) times; in determining the values for a single spectrophotometric curve requiring a wavelength correction, the eye must travel in transverse and vertical directions, continuously re-accommodating and re-focusing itself, at least one hundred and sixty times.

Conventional existing devices used for determining the values of spectrophotometric curves cause eye strain and discomfort and at best are tedious to operate and time consuming.

In order that the invention may be more clearly understood attention is hereby directed to the appended drawings, forming part of this application and illustrating one embodiment of the invention.

Referring to the drawings:

Figure 1 is a plan view of the spectrophotometric curve reading device embodying the invention;

Figure 2 is a side elevation of Figure 1;

Figure 6 is a view looking in the direction of arrows 6—6 of Figure 1, showing the method of holding the wavelength scale;

Figure 7 is a sectional view taken through the wavelength scale and holding device.

Similar reference characters refer to similar parts throughout the drawings.

Figure 3:
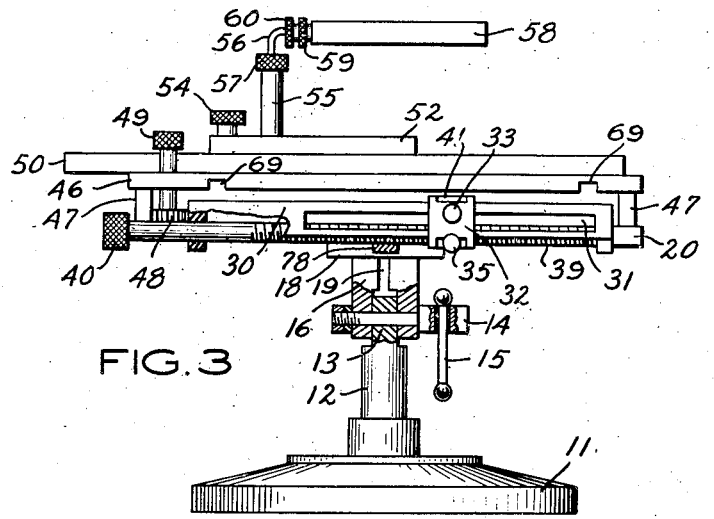
Figure 3 is an end view of the device of Figure 1.
Figure 4:
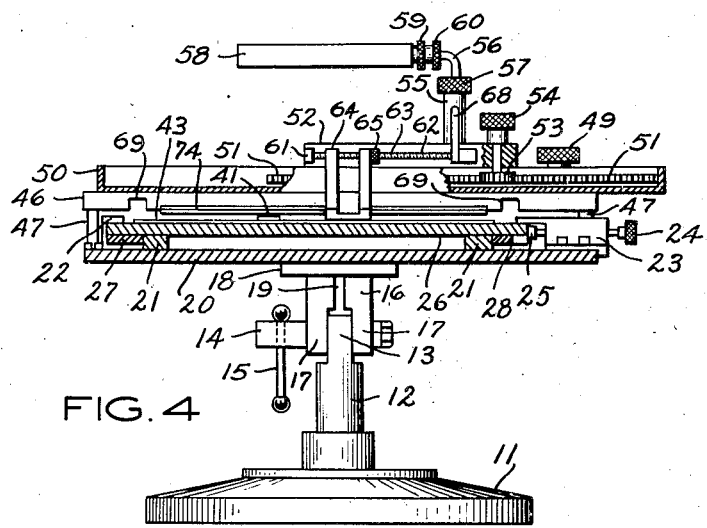
Figure 4 is a fragmentary sectional view taken along lines 4—4 of Figure 1.
Figure 5:
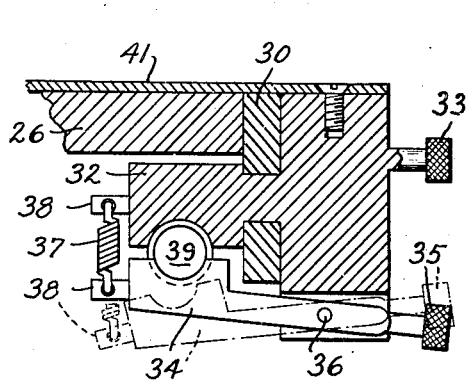
Figure 5 is an enlarged sectional view looking in direction of arrows 5—5 shown in Figure 1.

The construction of the instrument is divided into three main parts: (1) a table on which graphs and curves are read, (2) a stand for supporting the table, and (3) the wavelength setting mechanism that is mounted on the table for alignment with the curves on the graphs and for reading these curves at any point in the visible spectrum. The stand consists of a base 11 having a vertical post 12 formed into a hinge element 13 having a hole for the insertion of a tightening bolt 14. This bolt 14 has a bar 15 passing through near one end for two purposes, one for tightening the bolt, the other for providing a handle for turning the whole instrument around on whatever surface it may be situated. A hinge element 16 coacting wtih the element 13 has two legs 17 straddling the latter and adjustably positioned by the bolt 14. A space 19 between the legs affords sufficient clearance and a resilient capacity for them to spring when the bolt is tightened. They are mounted on the plate 18. This plate is attached to and supports the table 20, which can be tilted to various angles on the hinge. Guide channels 21 are placed longitudinally on the upper surface of the table 20.

The mechanism consists of a reciprocable carriage 26 having an upper plane surface on which the graph sheet 43 is attached. It is held in any part of its travel by the right and left hand clampss 22 and 23 respectively. Clamp 23 is provided with a spring tensioning handle 24 and shoe 25. A straight piece, called a guide bar 27 is disposed under the carriage 26 along one side to limit and guide it, while a similar one, 28, including a rack gear 29 is provided on the opposite side. The construction is conventional. A bridge 46 straddles the carriage 26. It is held above the level of the carriage 26 and table 20 by the studs 47, so that the parts thereon will not interfere with the movement of the carriage under it. The bridge 46 is stationary on the table 20 and carries the pinion 48 with its knob 49 to operate the gear rack. This permits the adjustable carriage 26 to travel horizontally under it and over the table 20. The carriage travel is controlled by a pinion 48 acting on the rack gear 29 when manually operated by its knob 49.

Figure 8:
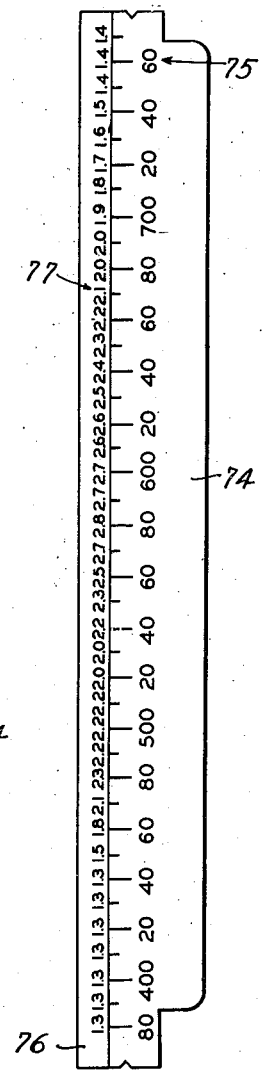
Figure 8 is a plan view of the wavelength scale with a typical wavelength correction applied.

At the front and rear of the carriage 26 is provided a reflectance scale mechanism for carrying a reflectance scale 41. This reflectance scale is attached as outlined in the following description, and is used for conveniently locating the scale at any point on the graph for the convenience of reading the items and comparisons thereof. At the front of the carriage 26 is fitted an end plate 30 having slots 31 for the guidance of a reflectance scale holder 32 which is moved transversely back and forth by the handle 33; a lower lever portion 34 of the holder is half-threaded and swung out of engagement with the screw 39 by a handle 35 which moves the lever 34 on its pivot 36. The lever portion 34 is tensioned by a spring 37 anchored to pins 38 on the lever 34 at one end and on the holder at the other end. The scale holder 32 travels across the front part of the carriage when the half-threaded lower lever portion 34 engages the threads of the screw 39 when rotated by knob 40 or can be moved rapidly by disengaging the threaded nut portion from contact with screw 39. The scale holder rigidly holds a movable reflectance scale 41 at the front and a channelled clip 42 supports it in slidable relation to the rear side of the carriage 26. Mounted at the rear top portion of the bridge 46 is a channel 50 which encloses a rack gear 51, and acts as a guide support for an adjustable magnifying lens bearing block 52. The lens bearing block is fitted with a gear 53 which engages rack gear 51 and is rotated manually by a knob 54 which moves the lens 58 and glass 66 back and forth. Projecting upward from the bearing block 52 is a hollow cylindrical support 55 into which is inserted a lens arm 56 keyseated at its lower end to allow the key in the hollow cylindrical support to keep the lens aligned with the bearing block 52. The lens arm is threaded at its lower end and made adjustable vertically in the hollow cylindrical support by a nut 57 to allow the lens 58 to be adjusted up and down to vary its magnifying focus. The upper end of the lens arm 56 is connected to the lens 58 by adjusting nuts 59 and 60. The rear of the bearing block 52 is fitted with supports 61 and rod 62 which is threaded at 63 for the reception of arms 64 which are positioned on the rod by a lock nut 65. The lower end of the arms are attached to a transparent glass 66 having a hairline 67 therein to assist in the correct wavelength setting and reading of the aforesaid curves. The glass 66 is moved transversely across the carriage 26 in a gradual and minute manner by the operation of the pinion 53 on the rack 51 and permits settings of the hair line 67 to .05 of a millimicron on the wavelength scale. Attached to one end of the rod 62 is a lever 68 for raising and lowering the transparent glass 66 from the spectrophotometric graph sheet 43. The bridge 46 is provided with slots 69 which allow finger nuts 70 attached to grippers 44 and alignment grippers 45 to pass through when the carriage 26 is moved longitudinally up and down the table 20. The grippers 44 and alignment grippers 45 are kept in alignment by pins 81 when the finger nuts are loosened to insert the graph sheet 43. The rear lower end of the bridge 46 (shown in Figure 6) is furnished with a slotted portion 71 that supports two stops 72 and spring clips 73 to hold the removable wavelength scale 74 in position. The wavelength scale (shown in Figure 8) has permanent wavelength graduations 75 and is provided with an unmarked section 76 located near the front edge which can be inscribed with a lead pencil or the like to show the wavelength correction 77 to be applied to a specific graph sheet. A stop 78 attached to table 20 is provided to contact the base 11 and protect the mechanism in the front end of the table and prevent it from striking the surface on which the base 11 is mounted. The movement of the carriage 26 towards the operator is limited by a projection 80 contacting the clamp 23.

Although the description has been given using a wavelength correction and by the weighted ordinate system of reading curves, the instrument may be used with or without a wavelength correction and is applicable to either the selected or weighted ordinate methods of analysis.

The operation of the device is as follows: A spectrophotometric graph sheet, with a vertical reflectance scale 82, at its left, a horizontal wavelength scale 83 at its lower edge (both scales being permanently engraved on its face) is lettered by properly identifying the wavelength calibration curve 85 and the sample curve 87. The positioning of the wavelength calibration curve 85 on the graph sheet is then compared with the true, known values for this curve and the difference between the two is inscribed on the detachable wavelength scale 74, provided for this purpose. These differences are known as the wavelength correction and are used to determine the true reading at each of the forty wavelengths for the spectrophotometric curve of the sample or samples measured.

The graph sheet 43 is placed on the carriage 26 and held lightly in place by grippers 44 and alignment grippers 45 through the adjustment of finger nuts 70 so that the reflectance scale 82 at the left of the graph sheet 43 coincides with the alignment grippers 45. Any wavelength, but preferably one near the center of the graph sheet 43 is covered by the hair-line 67 through the rotation of knob 54 and the carriage 26 is moved to bring the graph sheet 43 up and down under the hair-line 67 through the rotation of knob 49 to allow the full length of the selected wavelength to pass under said hair-line; the sheet is thus aligned in the instrument and the finger nuts 70 tightened. The detachable wavelength scale 74 is placed in position in the instrument and the machine is then ready for reading a curve. The movable reflectance scale 41 having graduations 88 which coincide with the vertical reflectance scale 82 is moved to a convenient position, the hair-line 67 is placed at the starting point to the extreme left of the graph sheet on the spectrophotometric curve 87 to be read. The reading for that wavelength or point is found by noting the wavelength correction, 77, applying it with the wavelength setting mechanism and then reading the reflectance at the point where the spectrophotometric curve and the corrected wavelength cross each other. The result is recorded on a data sheet provided for the purpose. The lens for magnifying the images of the spectrophotometric curve, the reflectance scale and the corrected wavelength scale is positioned over the hair-line 67 and is focused by rotating the nut 57. The transparent glass 66 and hairline 67 are moved horizontally across the sheet 43 by rotating the knob 54; the transparent glass is raised and lowered from the face of the spectrophotometric graph sheet by lever 68 when it is necessary for it to pass over the movable reflectance scale 41. The graph sheet 43 is moved up and down under the removable wavelength scale through the rotation of knob 49. The movable reflectance scale 41 can be quickly moved over the face of the graph sheet 43 by pressing the handles 33 and 35 together and releasing the threaded unit 34 from engagement with the screw 39, when the approximate position desired has been reached, the handles are released and the threaded unit 34 again engages the screw 39 and the finer adjustment is obtained by rotating the knob 49. The shoe 25 bears on the edge of the carriage 26 and acts as a brake when the table and carriage are tilted; it is removed from contact with the edge of the carriage when handle 24 is pulled out; this allows the carriage to be moved easily. The curve is read at each of the 40 wavelengths of the visible spectrum. Only 36 of these are shown on the conventional graph sheet but in precise work the curve is frequently extrapolated at 90 and 91 to give a reading at wavelengths 380 and 390 (at the violet end of the spectrum) and at 760 and 770 (at the red end of the spectrum).

The use of a glass 66 is a matter of convenience in this form of the invention, a piece of any other transparent material that would be serviceable under the same conditions could be used in place of it if it was more desirable to do so.

While but one general form of the invention is shown in the drawings and described in the specifications it is not desired to limit this application to this particular form or in any other way otherwise than limited by the scope thereof, as it is appreciated that other forms could be made that would use the same principles and come within the scope of the appended claims.

Having thus described the invention, what is claimed is:

1. An apparatus of the class described comprising in combination a reciprocating carriage including a plate arranged to support and hold a spectrophotometric curve sheet in readable position thereon and with clamps mounted on its sides, a scale including markings for determining the ordinate values of the curve on said sheet mounted on said carriage and movable across same to align with various points on said curve, another scale on the carriage for determining the values of abscissae of said curve, a table for supporting said carriage arranged to provide a path for the latter to reciprocate on, means for supporting the table and enabling same to be tilted to various angles and retained in such positions, a bridge attached to said table and permanently located in a predetermined position thereover, a magnifying lens movable across the bridge and alignable with the points on said curve for the examination and evaluation thereof, and means for adjusting the lens on said bridge.

2. An apparatus of the class described comprising in combination a reciprocating carriage including a plate arranged to support and hold a spectrophotometric curve sheet in readable position thereon and with clamps mounted on its sides, a scale including markings for determining the ordinate values of the curve on said sheet mounted on said carriage and movable across same to align with various points on said curve, another scale on the carriage for determining the values of abscissae of said curve, a table supporting said carriage arranged to provide a path for the latter to reciprocate on, means for supporting the table and enabling same to be tilted to various angles and retained in such positions, a bridge attached to said table and permanently located in a predetermined position thereover, a magnifying lens movable across the bridge and alignable with the points on said curve for the examination and evaluation thereof, means for adjusting the lens on said bridge, and a transparent pane mounted on said bridge including cross lines arranged for adjustable placement over the sheet for facilitating the evaluation of the curve in conjunction with the markings on said scales.

3. A spectrophotometric graph analyser comprising in combination, a table, a swivelling stand therefor, a carriage moveably mounted on the table in predetermined directions, and including a flat plate adapted to hold a graph sheet in readable position thereon, a reflectance scale on the carriage at one side thereof for aligning the graph sheet therewith, and determining the value of the graph, a wave length scale mounted on the bridge arranged at right angles to the direction of the reflectance scale, adapted to align with the graph to determine the values thereof, a bridge rigidly positioned on said table, a magnifying lens means movably attached to said bridge so as to permit its movement thereon and across the graph for the examination of said curve and comparison with said scales.

4. A spectrophotometric graph analyser comprising in combination, a table, a swivelling stand therefor, a carriage movably mounted on the table in predetermined directions, and including a flat plate adapted to hold a graph sheet in readable position thereon, a reflectance scale on the carriage at one side thereof for aligning the graph sheet therewith, and determining the value of the graph, a wave length scale mounted on the bridge arranged at right angles to the direction of the reflectance scale, adapted to align with the graph to determine the values thereof, a bridge rigidly positioned on said table, a magnifying lens means movably attached to said bridge so as to permit its movement thereon and across the graph for the examination of said curve and comparison with said scales, and a transparent pane with crosslines of predetermined form thereon mounted on said bridge to cover said sheet, said crosslines and markings on the scales being coordinated to permit the spectrometric evaluation of any point on said graph.

5. A spectrophotometric graph analyser comprising in combination, a table, a swivelling stand therefor, a carriage movably mounted on the table in predetermined directions, and including a flat plate adapted to hold a graph sheet in readable position thereon, a reflectance scale on the carriage at one side thereof for aligning the graph sheet therewith, and determining the value of the graph, a wave length scale mounted on the bridge arranged at right angles to the direction of the reflectance scale, adapted to align with the graph to determine the values thereof, a bridge rigidly positioned on said table, a magnifying lens means movably attached to said bridge so as to permit its movement thereon and across the graph for the examination of said curve and comparison with said scales, a transparent pane with crosslines of predetermined form thereon mounted on said bridge to cover said sheet, said crosslines and markings on the scales being coordinated to permit the spectrometric evaluation of any point on said graph, rack and pinion means for the manual adjustment of the carriage and lens over the table and graph thereon.

6. A spectrophotometric graph analyser comprising in combination, a table, including a swivelling stand therefor, a carriage movably mounted on the table in predetermined directions and including a flat plate adapted to hold a graph sheet in readable position thereon, a reflectance scale on the carriage at one side thereof for aligning the graph sheet therewith, and determining the value of the graph, a wave length scale mounted on the bridge arranged at right angles to the direction of the reflectance scale, adapted to align with the graph to determine the values thereof, a bridge rigidly positioned on said table, a magnifying lens means movably attached to said bridge so as to permit its movement thereon and across the graph for the examination of said curve and comparison with said scales, a transparent pane with cross lines of predetermined form thereon mounted on said bridge to cover said sheet, said crosslines and markings on the scales being coordinated to permit the spectrometric evaluation of any point on said graph, rack and pinion means for the manual adjustment of the carriage and lens over the table and graph thereon, said pane including a hairline for aligning selected points on said graph and permitting said lens to be placed in more conspicuous alignment under the lens, said table affording a space for a wave-length scale for registering wave length corrections to be referred to in a specific evaluation of the graph.

GENEVIEVE BECKER REIMANN.

(References on following page)

REFERENCES CITED

The following references are of record in the file of this patent:

UNITED STATES PATENTS

| Number | Name | Date |
|---|---|---|
| 443,359 | Duncan | Dec. 23, 1890 |
| 1,245,311 | Black | Nov. 6, 1917 |
| 1,370,870 | Zurawecki | Mar. 8, 1921 |
| 1,491,547 | Rembielinski | Apr. 22, 1924 |
| 1,615,216 | Cruger | Jan. 25, 1927 |
| 1,736,914 | Huebner | Nov. 26, 1929 |
| 1,977,213 | Slobey | Oct. 16, 1934 |
| 1,993,589 | Borden | Mar. 5, 1935 |

FOREIGN PATENTS

| Number | Country | Date |
|---|---|---|
| 2,330 | Great Britain | 1914 |